May 14, 1963 F. J. CARSON ETAL 3,089,319
GLASS BENDING APPARATUS
Filed March 12, 1953 4 Sheets-Sheet 1
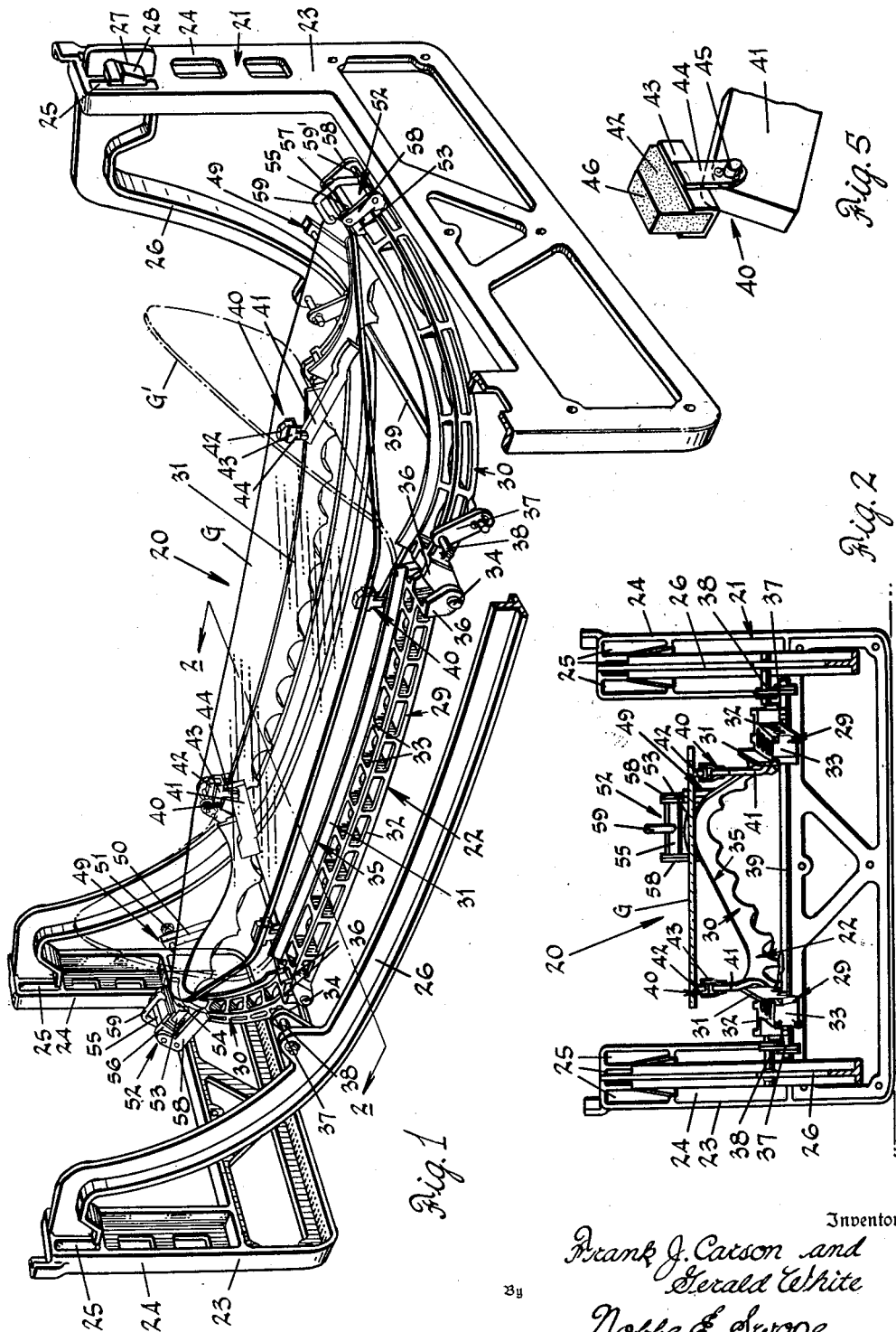
Inventors
Frank J. Carson and
Gerald White
By Nobbe & Swope
Attorneys

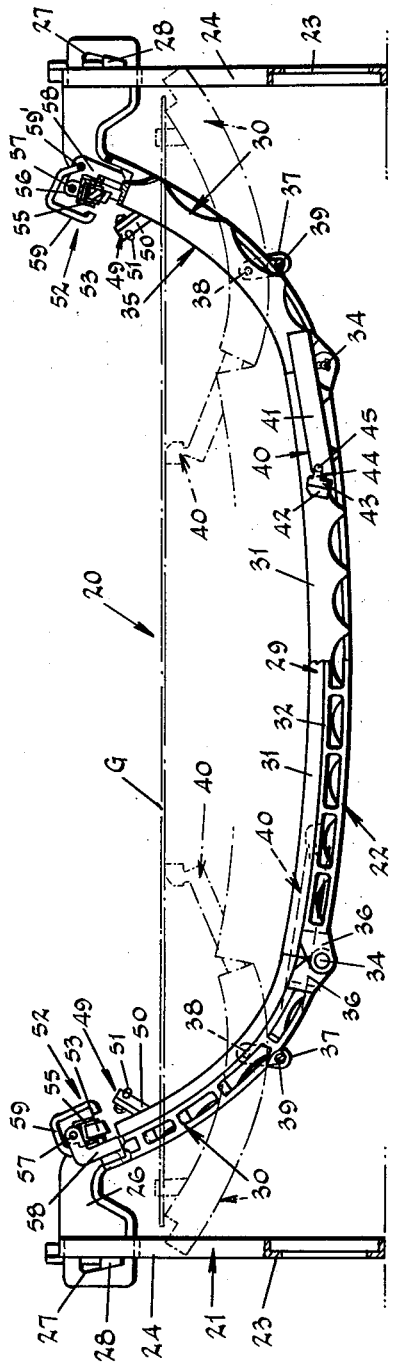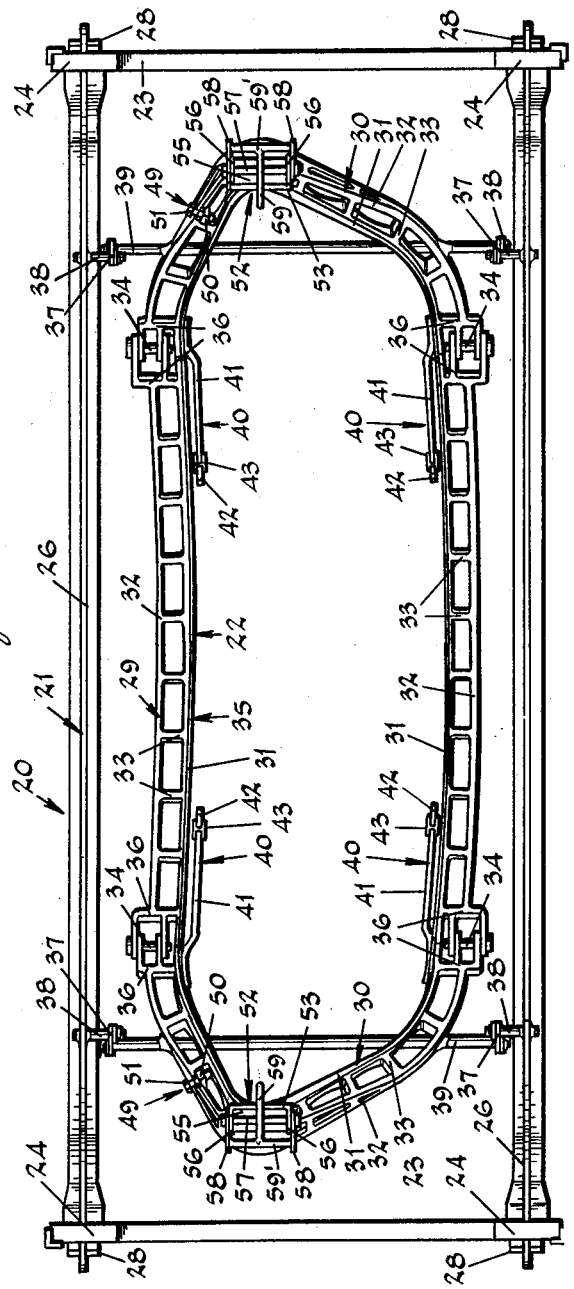

May 14, 1963  F. J. CARSON ETAL  3,089,319
GLASS BENDING APPARATUS
Filed March 12, 1953  4 Sheets-Sheet 3
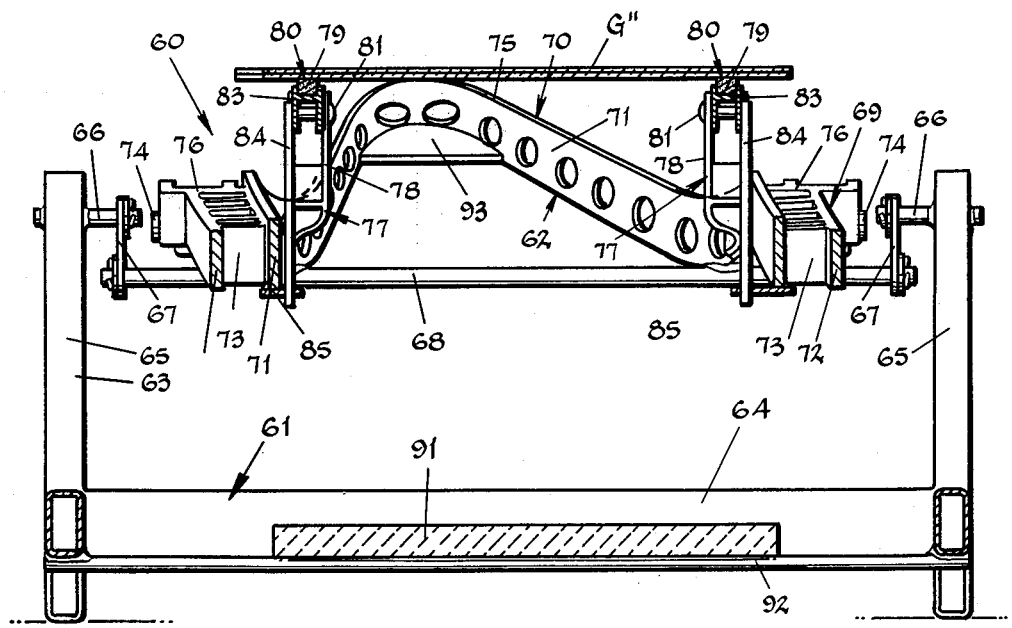
Fig. 9
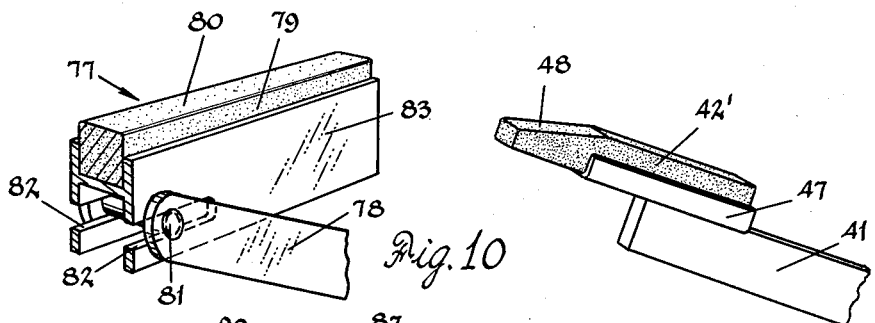
Fig. 10
Fig. 6
Fig. 11
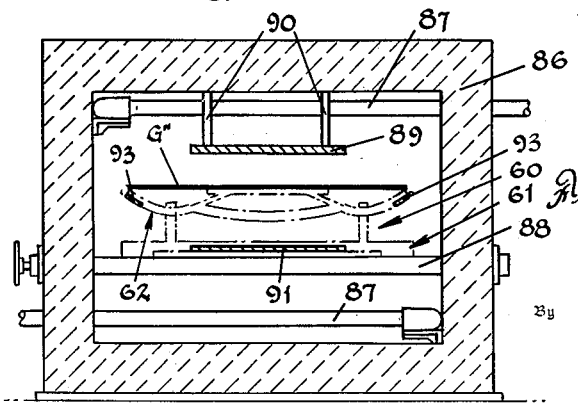
Inventors
Frank J. Carson and
Gerald White
By Nobbe & Swope
Attorneys

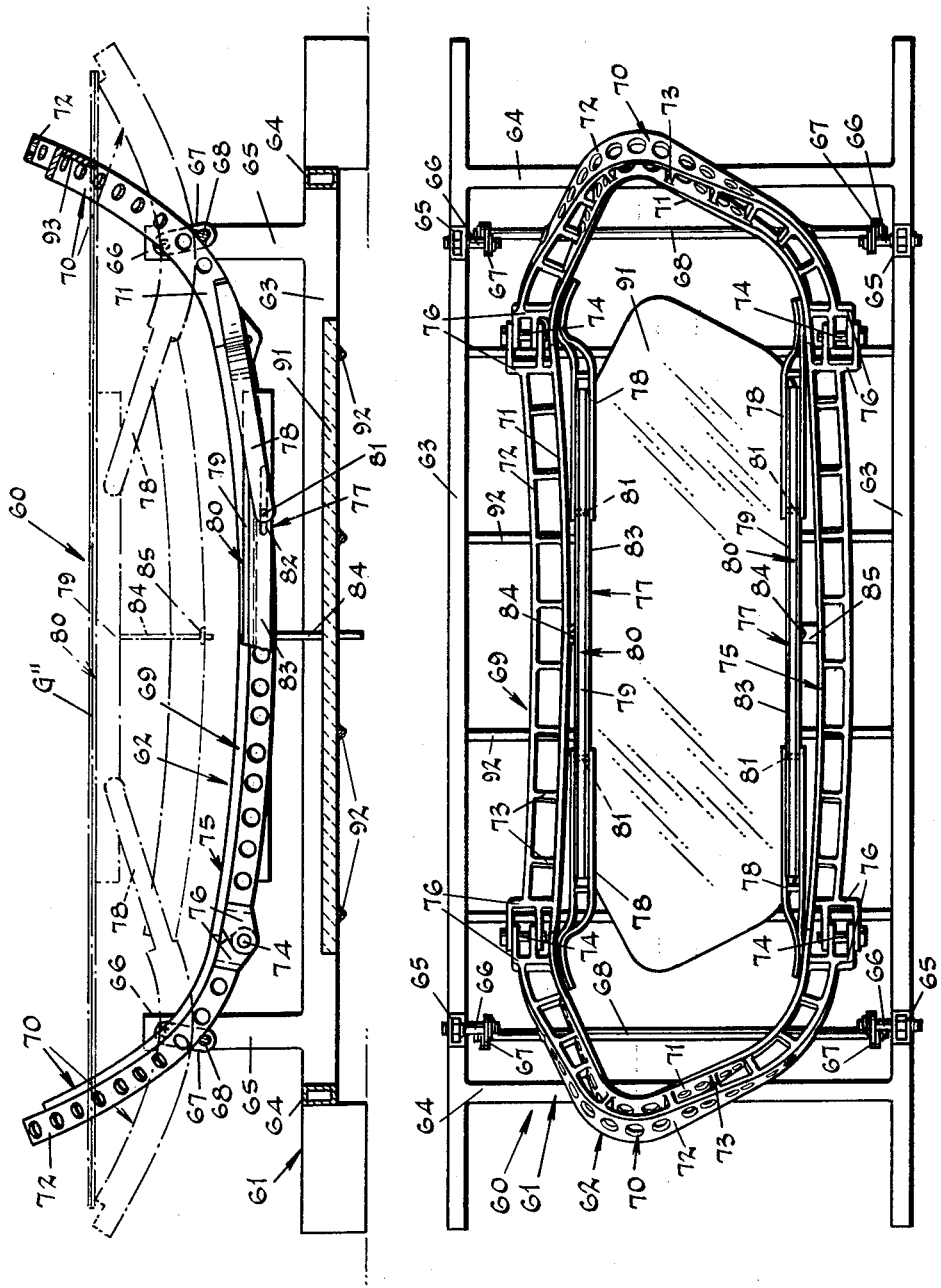

United States Patent Office 3,089,319
Patented May 14, 1963

3,089,319
GLASS BENDING APPARATUS
Frank J. Carson, Toledo, and Gerald White, Rossford, Ohio, assignors to Libbey-Owens-Ford Glass Company, Toledo, Ohio, a corporation of Ohio
Filed Mar. 12, 1953, Ser. No. 341,969
2 Claims. (Cl. 65—288)

This invention relates broadly to the bending of glass sheets or plates. More particularly, it relates to an improved method and apparatus for bending glass sheets or plates to predetermined curvatures.

The production of optically acceptable glass sheets having rather severe bends has become an increasingly troublesome manufacturing problem. As a consequence of the difficulty encountered in causing a glass sheet to freely conform to these severe curvatures, it has been found necessary to supplement the customary influences of heat and gravity during the actual bending of the sheets.

Thus, in addition to supporting a flat glass sheet above a mold shaping surface of the desired curvature and causing the same to bend into conformity therewith under the influence of heat and gravity, it has been proposed to simultaneously subject the ends of said sheet to compressive forces which cause said sheet to more rapidly and effectively conform to the curvature of the mold.

For example, as disclosed in Patents 2,551,606 and 2,551,607, the glass sheet may be supported above and bent into conformity with a multi-section, hinged type mold. A mold of this character is supported from a rack or frame structure so as to be swingable from a normal closed position, in which the sections thereof define a shaping surface of the desired curvature, to an open, spread-apart position for receiving the end edges of the flat glass sheet to be bent. When so received above the open mold, the glass sheet is rigidly held at its end edges between locating elements at end sections of the mold and acts as a strut in holding the mold in the open position. The tendency of the mold sections, acting through the locating elements, to move to the normal closed position exerts a compressive force on the end edges of the sheet. As the glass sheet is raised to its bending temperature, it begins to sag toward the mold and lose its strut-like character. Simultaneously, the mold sections begin to move to the closed position and thus exert progressively increasing forces on the end edges of the glass sheet, in a manner more fully described in the aforementioned patents, as the locating elements continue to engage and follow said end edges.

However, in keeping with modern automotive design, there has been a demand for bent glass windshields and backlights of even greater length and degree of curvature, and the prior art has failed to meet the problems presented thereby. For example, the ability of a flat glass sheet to act as a strut in resisting endwise compressive forces is dependent upon the ratio of its length to its thickness. Thus, it has been found that as the length of glass sheets of predetermined thickness increases, the ability of said sheets to hold a mold of the type described in an open, spread-apart position decreases. That is, a point is reached at which the flat glass sheets will either sag or fracture when subjected to the endwise compressive forces. Of course, if the flat sheets sag before being heated and while still brittle, the progressively increasing endwise forces will fracture or at least seriously distort the same.

As well, as the severity of curvature of the bent portions of the mold increases, the endwise forces necessary in causing the glass sheet to conform thereto are likewise increased. If these forces are too great, optical distortions are formed in the glass sheet making it unsatisfactory for use as an automobile windshield, backlight, or the like. Particular difficulty has been encountered in this respect when the pattern cut end edges of the glass sheet to be located are of pointed or progressively decreasing formation such that the forces exerted thereon are distributed over a relatively smaller area.

On the other hand, it may be found that due to the overall length of the glass sheet, the central portions thereof will bend too rapidly in which case difficulty may be encountered in causing the opposite end portions of the sheet to conform to the severely bent end portions of the mold. This is especially true in the case of an irregularly shaped pattern cut sheet wherein it is of considerable importance that all portions of the sheet contact the mold shaping surface at substantially the same time.

According to the present invention, however, there is provided an improved multi-section hinged type mold apparatus by means of which a relatively long glass sheet may be bent to a severe curvature without subjecting said sheet to direct endwise pressure.

It is therefore the principal object of this invention to provide improved apparatus for bending glass sheets having relatively high ratios of length to thickness.

It is another object of this invention to provide bending apparatus of the type described in which the glass sheets are supported intermediate their ends during the bending thereof.

Still another object of this invention is to provide improved bending apparatus of the type described in which the mold is held in an open position by the flat glass sheet without exerting endwise compressive forces thereon.

Still another object of this invention is to provide improved bending apparatus of the type described in which bending of the glass sheets is positively controlled in timed relation to the movement of the mold from the open to the closed position.

Still another object of this invention is to provide improved bending apparatus of the type described in which the flat planar length of the glass sheet acting as a beam serves to hold the mold in the open, spread-apart position.

Other objects and advantages of the invention will become more apparent during the course of the following description when taken in connection with the accompanying drawings.

There is provided, according to this invention, an improved multi-section hinged type mold having associated therewith novel means for supporting the intermediate portions of the glass sheet. More particularly, this novel supporting means is connected with the end sections of the mold and movable therewith during movement of the mold from the open to the closed position so as to engage the underside of the flat glass sheet to be bent in the open mold position and to continue in engagement therewith during bending of said sheet and movement of the mold to the closed position.

By means of this intermediate support, the tendency of a relatively long flat glass sheet to sag while supported above the mold is materially lessened. As well, the tendency of the central portions of the sheet to bend too rapidly is controlled by the coordinated movement of the intermediate support in maintaining engagement with said sheet during the bending thereof.

Of equal importance is the fact that the provision of intermediate support for the glass sheet when flat obviates the necessity of using the sheet as a strut in holding the mold in the open, spread-apart position and thus exerting excessive endwise pressure thereon. That is, when supported in the manner described, the flat glass sheet may be laid upon the open mold in such a manner that the end edges of said sheet merely rest upon the end sections of the mold. In this position then, the flat glass sheet is supported as a beam at both ends and intermediate thereof.

It has been found that when so positioned on the open mold, the stiffness and weight of the glass sheet itself serves to hold the mold open until said sheet is softened and starts to bend. That is, in contradistinction to the hinged type molds of the prior art, in which locating elements were used to engage the flat glass sheet at only its opposite end edges whereby the rigidity or resistance of the sheet as a column or strut was used in holding the mold open, by means of the present invention the mold is held open by the glass sheet acting as a beam in resisting the bending moments exerted thereon by the end sections of the mold upon which the end edges of the glass sheet are rested.

According to the present invention, as the glass sheet softens under the influence of heat, it loses its stiffness and the resistance of its weight is overcome by the bending moments exerted by the end sections of the mold. As a result, the end portions of the sheet begin to bend and the mold simultaneously begins to move to the closed position. As the mold closes and the intermediate supporting means is lowered in timed relation thereto, the end sections of the mold "wrap around" or fold the end portions of the glass toward their finally bent curvature. Of course, as the intermediate support is lowered, the beam action of the sheet decreases such that the folding or bending action of each of the end sections of the mold is exerted in progressively increasing fashion.

In the accompanying drawings, wherein like numerals are employed to designate like parts throughout the same:

FIG. 1 is a perspective view of one form of the improved bending apparatus of this invention which is particularly adapted for the bending of automobile backlights;

FIG. 2 is a transverse sectional view of the bending apparatus of FIG. 1 taken substantially along the line 2—2;

FIG. 3 is a plan view of the bending apparatus of FIG. 1;

FIG. 4 is a longitudinal elevational view, partly in section, of the bending apparatus of FIG. 1;

FIG. 5 is a detail view of the sheet supporting finger shown in FIGS. 1 to 4;

FIG. 6 is a detail view of an alternative type of sheet supporting finger;

FIG. 7 is a longitudinal elevational view, partly in section, of another form of the improved bending apparatus of this invention which is particularly adapted for the bending of automobile windshields;

FIG. 8 is a plan view of the bending apparatus of FIG. 7;

FIG. 9 is an enlarged transverse center sectional view of the bending apparatus of FIG. 7;

FIG. 10 is a detail sectional view of the sheet supporting bar shown in FIGS. 7 to 9; and FIG. 11 is a transverse sectional view of a furnace construction through which the bending apparatus of FIGS. 7 to 10 may be conveyed for bending windshields.

Referring now in particular to the above described drawings, there is shown in perspective in FIG. 1 one form of the improved bending apparatus, designated in its entirety by the numeral 20, and which, as will be explained hereinafter, is particularly suited for the bending of automobile backlights. This apparatus 20 includes a frame 21 upon which a multi-section hinged type bending mold 22 is supported for movement into an open and a closed position. The mold 22 is shown in the open position in FIGS. 1 and 2 with a flat glass sheet G resting thereupon in operative position to be bent into the shape indicated by the broken lines at G'. FIGS. 3 and 4 show the mold 22 in the closed position, FIG. 4 further illustrating in broken lines the relative positions of the mold sections in the open position.

The frame 21 includes substantially U shaped end racks 23 having upright leg members 24 at each end thereof. The upper ends of the leg members 24 are provided with a series of slots 25 which receive the opposite ends of flanged side racks 26 to form the rectangular plan shape of the frame 21. The outer ends of the side racks 26 are provided with slots 27 through which wedges 28 may be placed to cause the flanged portions of said side racks to abut securely against the opposite sides of the leg members 24. The series of slots 25 in each of the leg members 24 permit the effective width of the frame 21 to be adjusted as desired. It will be noted from FIG. 4 that the side racks 26 are shaped throughout their lengths so as to at least approximately correspond to the curvature of the mold 22 in the closed position.

The mold 22 comprises a center section 29 and end sections 30, each of which is formed from inner and outer rails 31 and 32 rigidly connected to one another by cross members 33. The mold sections 29 and 30 are hingedly connected together in end-to-end relation by pins 34 such that, in the closed position of the mold, the inner rail 31 thereof defines a continuous shaping surface 35 of an outline corresponding to that of the bent glass sheet G'. The pins 34 are received through oppositely disposed and interfitting F-shaped hinge members 36 at adjacent ends of the mold sections. As best shown in FIG. 4, the opposite edges of the inner rail 31 of the mold sections are finished so as to abut with one another in the closed position of the mold.

The mold 22 is swingably supported from the frame 21 by means of links 37 pivotally carried at their upper ends at substantially the four corners of the frame by pins 38 and pivotally carrying at their lower ends a rod 39 welded or otherwise secured to the underside of each of the mold end sections 30. In the closed position of the mold, the links 37 are substantially plumb, as best shown in FIG. 4. As the mold sections are spread apart on the hinge pins 34, however, the links are swung to an out-of-plumb position as the center section 29 is raised and the end sections 30 are swung outwardly.

In this open position, there is of course a natural tendency for the mold to return to the closed position. However, this tendency can be minimized to a certain extent by locating each of the rods 39, upon which the end sections 30 are carried, at a point intermediate the inner and outer ends of said sections. That is, in this manner, the tendency of the mold 22 to return to the closed position can be more easily counterbalanced by forces exerted on the outer ends of the mold end sections 30 and acting through the lever arm formed between said outer ends and the rods 39.

The novel sheet supporting means 40 of this form of the invention comprises a bar 41 welded or otherwise secured at one end to each side of the mold end sections 30 adjacent the inner ends thereof and carrying at its opposite free end a finger member 42 (FIGS. 1 to 5) or 42' (FIG. 6) of Marinite, graphite, or other suitable material which will not fuse with the glass sheet at the bending temperature thereof. Each of the fingers 42 may be received along its bottom edge in a jacket 43 pivotally carried from the free end of bar 41 by arms 44 and pin 45, as shown in FIGS. 1 to 5, in which case the substantially horizontal upper surface 46 (FIG. 5) of the finger is adapted to contact the underside of the glass sheet. On the other hand, each of the fingers 42' may be received in an elongated jacket 47 which is rigidly secured to the free end of bar 41, as shown in FIG. 6, in which case the beveled upper surface 48 is adapted to contact the glass sheet.

In either case, however, each of the bars 41 is secured to and movable with its respective mold end section 30 in such a manner as to permit the sheet contacting surface of its finger member to be lifted into substantially coplanar relationship with the opposite end edges of the shaping surface 35 of said end sections of the mold in the open position thereof. That is, the bars 41 are so arranged that as the mold 22 is spread apart to its open position and the end edges of a flat glass sheet G are rested and located upon the shaping surface at the outer ends of each of the end sections 30, as shown in FIG. 1, said sheet will be supported at both ends and intermediate thereof. It will be noted in this respect, that the bars 41 extend substantially parallel to and in slightly spaced relation from the shaping surface 35 of the mold such that those intermediate portions of the flat glass sheet G contacted by the fingers 42 or 42' are almost adjacent the outer edges thereof. In this manner, any distortions which might result in the glass from contact with said fingers would be at or close to the marginal area of the glass sheet received in an automobile frame or other suitable mounting member.

The flat glass sheet G is initially centrally located lengthwise or longitudinally on the mold 22 by resting said sheet in balanced relation on the shaping surface 35 thereof, as best shown in FIG. 4. Locating devices 49 may be used in centering the sheet sidewise or laterally of the mold. One or more of these devices 49 may be placed at any convenient location along the sides of the mold and each comprises an arm 50 secured to and upstanding from a mold section (in this case, from the leftmost end section 30) and a screw 51 threadedly received in the upper end of said arm. In the open position of the mold, the inner end of the screw 51 is disposed at the level of a flat glass sheet G resting on the mold and may be properly adjusted to form a guide against which a side edge of said sheet may be located.

In this particular embodiment of the present invention, the flat glass sheet is supported at four different locations intermediate its end supports. It will be understood, however, that it may be found that one or more of such supports are sufficient. For example, two bar-like supports may be provided, one at each side of the sheet, as shown in the form of this invention illustrated in FIGS. 7 to 10 and to be described in detail hereinafter. Generally, however, it is essential that the novel supporting means support the glass sheet in a substantially balanced manner, longitudinally as well as laterally, intermediate the ends of said sheet.

It is, as previously mentioned, desirable that the intermediate supporting means 40 contact a minimum of the surface of the glass sheet such that distortions, if any, are likewise kept to a minimum. In connection with the problem of minimum contact area by the supporting means, it will also be understood that further problems are encountered in the case of automobile backlights and other bent glass articles which are tempered or heat treated subsequent to the bending thereof. It is common in the art, in tempering bent glass sheets, to pass the sheets, while supported on a mold and frame therefor as shown herein, sidewise between blast heads conforming to the curvature of said sheets. It is of prime importance that the tempering blast cover substantially all of both surfaces of the bent sheets. It will be readily understood therefore that the improved bending apparatus 20 of this invention, and particularly the novel supporting means 40 in providing only minimum contact with the underside of the glass sheet, is especially well adapted for the production of bent backlights and the like.

As mentioned previously and as will be obvious from the foregoing description, when the flat glass sheet G is supported at both ends and intermediate thereof, its tendency to sag will be materially lessened. Thus, by means of the improved apparatus of this invention, it is possible to bend glass sheets of substantially greater length than has heretofore been possible in the art. As well, in merely resting at its opposite ends on the outer shaping surface 35 of the mold end sections 30, the flat glass sheet G is permitted to act as a beam in holding the mold 22 in the open, spread-apart position prior to the bending thereof.

In this flat position, the rigidity of the glass sheet G to bending and its weight adjacent the ends thereof resting on the end sections of the mold 22 serve to hold the mold sections open. That is, the natural tendency of the mold to close acts as a bending moment at each end of the flat glass sheet through the portions of the shaping surface 35 on which the said end sections of the sheet are rested. Inasmuch as the end sections rest freely upon said shaping surface, the aforementioned rigidity and weight of the sheet act to counteract the bending moments exerted thereon. Of course, the effect of this counter-force is dependent upon and can be regulated by the location of rod 39 between the inner and outer ends of the mold sections 30. It will also be understood that inasmuch as intermediate portions of the flat sheet are given support and the tendency of the sheet to sag is materially lessened, the counter-force required to resist the bending moments exerted by the mold end sections is likewise reduced.

In this manner then, a flat glass sheet G may be located in bending position on an open mold, as shown in FIG. 1, and the mold held in the open position by the sheet itself without exerting endwise forces thereon. At the same time, it is possible to produce the severe bends which were heretofore possible only in connection with the application of endwise pressure on the sheets. That is, it has been found that as the sheet begins to bend, the forces exerted on the ends thereof, and tending to "wrap around" or fold the sheet, are gradually increased in causing the sheet to finally conform to the severe curvatures of the mold at substantially the completion of the bending cycle.

Thus, as the flat glass sheet G supported above the mold in the manner described is subjected to the bending temperatures thereof, it will first begin to sag at its opposite end portions at both sides of the intermediate support therefor. As the end portions of the sheet become molten and begin to sag, the forces exerted by the end sections 30 of the mold on said end portions will overcome the resistance of the sheet to bending and said end sections will begin to swing to the closed position. As the end sections begin to swing inwardly, the mold center section 29 drops towards its closed position permitting the glass sheet to also sag at its central portion resting on the intermediate supporting means 40. It will be undersood, however, that at this period of the bending cycle, the central portion of the glass sheet is still supported by said supporting means. In this connection, it will also be noted that the contacting surface 46 of finger 42 will at all times be maintained flat with respect to the surface of the glass sheet supported thereon by means of its pivotal connection to the bar 41. On the other hand, while the finger 42' (FIG. 6) is rigidly carried by the bar 41, its beveled contacting surface 48 is so disposed with respect to the flat glass sheet that it will be substantially flat with respect to said sheet a all times during the bending thereof.

Of course, as the central portions of the glass sheet are lowered and the end portions thereof raised, the forces exerted by the mold end sections 30 are increased and the ability of the glass sheet to resist the bending moments resulting therefrom is decreased. Thus, from its flat to its finally bent position, the glass sheet is subjected to gradually increasing forces which therefore are greatest at the completion of the bending cycle in causing the bent glass sheet to conform to the most severe curvatures of the mold shaping surfaces 35. As the mold moves to the closed position and the bent glass sheet G' settles into conformity with the shaping surface 35, the fingers 42 or 42' of the supporting means will become separated from those portions of the sheet supported thereon and will drop just below the said shaping surface, as best shown in FIG. 4.

It will be understood, however, especially from FIG. 4, that as the mold 22 moves from the open to the closed position, the opposite pairs of sheet supporting fingers 42 or 42' on each of the mold end sections 30 will be caused to move longitudinally toward one another. That is, in moving from their open position, shown by the broken lines of FIG. 4, to their closed position, shown by the solid lines, opposite pairs of said fingers are brought closer together. It has been found, as a practical matter, that the frictional grab by one of said pairs of fingers on the surface of the glass sheet is greater than that of the other. As a result, although the flat glass sheet G may be centrally located longitudinally with respect to the mold 22 prior to the bending thereof, there is a tendency for the sheet to be shifted longitudinally during the actual bending operation.

This problem may be overcome by the provision of limiting means disposed at each end of the mold 22 and operable during movement of said mold from the open to the closed position to maintain the bending glass sheet in properly balanced position longitudinally thereof. More particularly, the limiting means, designated in their entirety by the numeral 52, include block members 53, of Marinite or other suitable material similar to the fingers 42 or 42', which are mounted adjacent the shaping surface 35 of the outer ends of each of the mold end sections 30 so as to be slightly spaced from the end edges of the glass sheet centrally located on the mold 22.

In being mounted with the mold end sections 30, the block members 53 are movable therewith from the open to the closed position of the mold. Thus, during the bending thereof, all but a negligible amount of longitudinal shifting of the glass sheet is limited by engagement of an end edge of said sheet with its adjacent block member. At the same time, it will be understood that both block members are never simultaneously engaged by said end edges of the glass sheet so that the glass sheet is at no time subjected to endwise pressure. Of course, in addition to limiting the longitudinal movement of the bending glass sheet, the limiting means 52 serve as additional means for centrally locating the flat glass sheet G longitudinally above the open mold.

Preferably, the sheet edge contacting face of block member 53 is curved as at 54 (FIG. 1) to conform to the end edge of the glass sheet adapted to be contacted thereby. The block member 53 is received in a jacket 55 having ears 56 pivotally carried on a rod 57. The rod 57 is carried outwardly of the ears 56 by spaced L-shaped arms 58 secured to the outer end of end mold section 30. In the lower pivotal position of the block member 53, the jacket 55 is adapted to rest upon the upper edge of the outer rail 32 of the end mold section. The upward pivotal movement of the block member is limited by a hooked bar 59 carried by a rod 59' disposed between the L-shaped arms 58.

In the other form of the improved bending apparatus of this invention which, as will be explained hereinafter, has been found particularly well suited for the bending of automobile windshield lights, is designated in its entirety by the numeral 60 and shown in detail in FIGS. 7 to 10. This apparatus 60 includes, similarly to the apparatus 20 of FIGS. 1 to 6, a frame 61 upon which a multi-section hinged type bending mold 62 is supported for movement into an open and a closed position. The mold 62 is shown in the open position by the broken lines of FIG. 7 with a matched pair of flat glass sheets GG resting thereupon in operative position to be bent into conformity with the curvature of the closed mold, which is shown by the solid lines of said figure as well as FIGS. 8 and 9.

The frame 61 includes longitudinal side members 63 connecting with transverse end members 64 to form a substantially rectangular base therefor. Upstanding arms 65 are disposed toward the four corners of the rectangular base and each carries a pin 66 at its upper end. Links 67 are pivotally carried by said pins to swingably support a rod 68 extending between opposite links and pivotally carried thereby at its opposite ends.

The mold 62 comprises, similarly to the mold 22 of FIGS. 1 to 6, a center section 69 and end sections 70, each of which is formed from inner and outer rails 71 and 72 rigidly connected to one another by cross members 73. In other respects also, the mold 62 is similar to the mold 22 in that sections 69 and 70 are hingedly connected together in end-to-end relation by pins 74; that in the closed position of the mold, the inner rail 71 of the mold sections defines a continuous shaping surface 75 of an outline corresponding to that of the matched sheets GG when finally bent; that the pins 74 are received through F shaped hinge members 76 at adjacent ends of the mold sections; and that the opposite edges of the mold sections are finished so as to abut with one another in the closed positions of the mold.

The end sections 70 of the mold 62 are welded or otherwise secured intermediate their ends to the transversely extending rods 68 of the frame 61 such that the sections of the mold 62 are swingable into an open and a closed position in the same manner as are the mold sections of the mold 22.

The novel sheet supporting means 77 of this form of the invention comprises forked arms 78 secured at one end to each inner side of the mold end sections 70 and extending substantially longitudinally of the mold and in opposed relation to carry bars 79 extending longitudinally between their free forked ends. Similarly to the fingers 42 or 42', the bars 79 may be made of Marinite, graphite, or other suitable material which will not fuse with the glass sheets at the bending temperatures thereof.

Each of the arms 78 is secured to and movable with its respective mold end section 70 in such a manner as to permit the upper sheet contacting edge 80 of the bars 79 to be lifted into substantially coplanar relation with the opposite end edges of the shaping surfaces 75 of said mold sections in the open position thereof. In this manner then, when the mold is opened or spread apart and the end edges of the flat glass sheets GG are rested and located upon the shaping surface thereof at the outer ends of each of the end sections 70, said sheets will be supported at both ends and intermediate thereof. The arms 78 are further arranged so that as the mold moves from the open to the closed position, the bars 79 will be caused to move vertically to a point when the mold is finally closed just below the mold shaping surface 75. During this movement, the bars 79 are maintained at all times in a position parallel to their original flat sheet supporting position in the open position of the mold.

To maintain this constantly level relation of the bars 79, each of said bars is carried at opposite ends by a pin 81 through the forked ends of the arms 78, each of said pins being received and slidable in slots 82 extended longitudinally of jackets 83 for the bars 79. A rod 84 is secured to and depends from an intermediate portion of each of the jackets 83 and is guidably received in an opening in a small plate 85 carried by the inner rail 71 of the mold center section 69. Thus, the bars 79 are connected to the mold sections in such a manner that the upper sheet contacting edge 80 of each of said bars is maintained in a level position with respect to the glass sheets GG from the open to the closed position of the mold. At the same time, the bars 79 are caused to move vertically so that there is no longitudinal shifting thereof. In this manner, the glass sheets GG will be moved from their flat to their bent position without being shifted longitudinally of the mold such that there is no necessity in this form of the invention for limiting means, such as 52 used in connection with the bending apparatus 20 of FIGS. 1 to 6. Thus, the flat glass sheets GG need merely be initially centered longitudinally of the mold 62 and will be maintained in said centered relation with respect to said mold during the actual bending operation.

Similarly to the bars 41 of the bending apparatus 20, however, the arms 78 extend substantially parallel to and in slightly spaced relation from the shaping surface 75 of the mold 62 such that the intermediate portions of the glass sheets contacted by the bars 79 are almost adjacent the outer edges thereof. As well, it will be noted that although the bars 79 are relatively long so as to extend a substantial length of glass sheets supported thereby, they are quite narrow and contact only a minor portion of said sheets.

Unlike automobile backlights, windshield lights are generally not tempered but rather are laminated together in matched pairs as a "sandwich" with an inner-layer of plastic material. Thus, this form of bending apparatus 60 may be used to great advantage in the bending of windshield lights, such as the matched glass sheets GG. That is, inasmuch as this form of bending apparatus need not be passed through blast heads for heat treating opposite sides of the glass sheets supported thereon, there is of course no longer the compelling need for an absolute minimum of contact with the glass sheets. In like manner, the frame 61 may be of simpler construction, particularly the side members therefor, inasmuch as the frame need not be passed sidewise between said blast heads.

The mechanical operation of the mold sections 69 and 70 and the novel sheet supporting means 77 of this form of bending apparatus 60 are, of course, similar to the corresponding members of bending apparatus 20 and the description thereof need not be repeated. However, there is also disclosed in FIG. 11 a novel and improved furnace construction including a shielding arrangement found well suited for heating to bending temperatures, glass sheets which may be supported in the manner described on multi-section hinged type bending mold apparatus of this general character and passed continuously through said furnace construction.

In general, however, this improved furnace construction has been found to be of greatest advantage when used in cooperation with shielding means on the bending mold apparatus itself, in a manner to be described hereinafter. For this reason, the improved furnace construction is of greater utility in connection with the bending mold apparatus 60, particularly adapted for the bending of windshield lights which need not be tempered, inasmuch as shielding means on said apparatus would otherwise interfere with said heat treating process of the glass sheets.

As shown in FIG 11, this furnace construction includes a tunnel-like furnace 86 having heating elements 87 disposed transversely of the top and bottom walls thereof for raising the glass sheets GG to bending temperature. The bending apparatus 60 is adapted to be moved through the furnace on a roller type conveyor 88 disposed between the upper and lower heating elements 87.

A series of shields 89 are arranged longitudinally of the furnace 86 and suspended from the top wall thereof by hangers 90 so as to be at least approximately centered with respect to the path of the mold apparatus 60. These shields 89 are spaced above the path of said mold apparatus and are of a width corresponding to the length of the center mold section 69. A shield 91, similar to the furnace shields 89, is placed upon rods 92 (FIGS. 7 to 9) extending transversely between the longitudinal side members 63 of the frame 61. This shield 91 may correspond to the outline of the shield 89. As can be seen from FIG. 11, the glass sheets GG, when supported on the bending apparatus 60, are approximately equally spaced from the furnace and mold shields 89 and 91, respectively.

It will be readily understood that the shields 89 and 91 serve to shield the intermediate portions of the glass sheets which are bent a relatively small amount. In this manner not only may greater heat be applied to the severely bent end portions of sheets but also the tendency of said sheets to sag at their intermediate portions may to a certain extent be controlled. Still further, inasmuch as heat is radiated from the heating elements 87 both above and below the glass sheets, each of the furnace and mold shields 89 and 91 acts as a shield for the other and prevents heat from being reflected therefrom onto the intermediate portions of said sheets. That is, for example, the furnace shield 89 serves to shield off radiant heat from the upper heating elements which would otherwise be reflected from the mold shield 91 onto the underside of the intermediate portions of the glass sheets GG. In this connection, the shields 89 and 91 may be made of Marinite (registered trademark), metal or a suitable insulating material. Preferably, however, the mold shield 91 is of Marinite as metal has been found to disturb the subsequent annealing operation to which the glass sheets are subjected after bending.

"Marinite" is a registered trademark of the Johns-Manville Co. and is used by them to designate a specific lime silicate bonded porous refractory composition having over 50% silica and alumina, the other major ingredients of which are iron (as $Fe_2O_2$) and calcium oxide. A representative analysis of Marinite is substantially as follows:

| | Percent |
|---|---|
| $SiO_2$ | 50.64 |
| Total iron (as $Fe_2O_2$) | 17.80 |
| $Al_2O_3$ | 6.28 |
| CaO | 10.77 |
| MgO | 4.86 |
| $Na_2O$ | 0.66 |
| $SO_3$ | 0.12 |
| Loss on ignition | 9.90 |
| Total | 101.03 |

Smaller shields 93 may be disposed at each outer end of the mold end sections 70 below the outer ends of the glass sheets supported on the bending apparatus 60. These shields are secured to the outer ends of the inner rails 71 of each of the mold end sections and may be made of metal which will absorb the heat adjacent the outer ends of the glass sheets which otherwise have a tendency to "curl" or bend away from the outer ends of the mold shaping surface 75.

It is to be understood that the forms of the invention disclosed herein are to be taken as the preferred embodiments thereof, and that various changes in the shape, size and arrangement of parts may be resorted to without departing from the spirit of the invention or the scope of the following claims.

We claim:

1. In a bending apparatus for bending glass sheets, a plurality of mold sections including a central section and substantially triangular movable end sections, and a metal heat absorbing member carried by each of the triangular end sections at the apex thereof and entirely within the confines of each of the mold end sections and positioned beneath the portions of the glass sheet when mounted above the mold sections which is to be bent into conformity with said end sections.

2. In a bending mold for bending glass sheets, a pair of spaced shaping rails having a shaping surface formed thereon defining a predetermined curvature to which a glass sheet is to be bent, at least one of said rails converging toward the other rail at adjacent ends thereof and jointed to one another at their outermost ends, and a metal heat absorbing member carried by the mold shaping rails adjacent the converging portions thereof, said heat absorbing member being mounted in close proximity to said shaping surface and within an area defined by the converging portions of said shaping rails and also positioned beneath the surface of the portion of the glass sheet when mounted on said mold which is to be bent into conformity with the converging portions of said shaping rails.

References Cited in the file of this patent

UNITED STATES PATENTS

| | | |
|---|---|---|
| 760,959 | Connington | May 24, 1904 |
| 833,436 | Borland et al. | Oct. 16, 1906 |
| 1,999,558 | Black | Apr. 30, 1935 |
| 2,348,278 | Boyles et al. | May 9, 1944 |
| 2,348,279 | Boyles et al. | May 9, 1944 |
| 2,450,297 | Pearse et al. | Sept. 28, 1948 |
| 2,452,488 | Paddock et al. | Oct. 26, 1948 |
| 2,518,951 | Smith | Aug. 15, 1950 |
| 2,551,607 | Jendrisak | May 8, 1951 |
| 2,554,572 | Jendrisak | May 29, 1951 |
| 2,608,799 | Babcock | Sept. 2, 1952 |
| 2,646,647 | Bamford et al. | July 28, 1953 |
| 2,720,729 | Rugg | Oct. 18, 1955 |
| 2,814,164 | Carson et al. | Nov. 26, 1957 |

OTHER REFERENCES

"Handbook of Material Trade Names," by Zimmerman and Lavine, published by Industrial Research Service, 1953.